US012301515B2

(12) United States Patent
Shin et al.

(10) Patent No.: US 12,301,515 B2
(45) Date of Patent: *May 13, 2025

(54) METHOD AND APPARATUS FOR POWER CONTROL OF SOUNDING REFERENCE SIGNAL (SRS) TRANSMISSION

(71) Applicant: InterDigital Patent Holdings, Inc., Wilmington, DE (US)

(72) Inventors: Sung-Hyuk Shin, Northvale, NJ (US); Joseph S. Levy, Merrick, NY (US); Kyle Jung-Lin Pan, Saint James, NY (US); Philip J. Pietraski, Jericho, NY (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,462

(22) Filed: Oct. 12, 2023

(65) Prior Publication Data

US 2024/0072983 A1 Feb. 29, 2024

Related U.S. Application Data

(63) Continuation of application No. 17/716,570, filed on Apr. 8, 2022, now Pat. No. 11,824,816, which is a
(Continued)

(51) Int. Cl.
*H04L 5/00* (2006.01)
*H04B 7/0413* (2017.01)
(Continued)

(52) U.S. Cl.
CPC ........... *H04L 5/0096* (2013.01); *H04B 7/061* (2013.01); *H04B 7/0691* (2013.01); *H04W 52/32* (2013.01); *H04W 52/34* (2013.01)

(58) Field of Classification Search
CPC ..... H04L 5/0096; H04B 7/061; H04B 7/0691; H04B 7/0413; H04W 52/32; H04W 52/34;
(Continued)

(56) References Cited

U.S. PATENT DOCUMENTS 5,566,165 A 10/1996 Sawahashi et al.
6,545,997 B1 4/2003 Boehnke et al.
(Continued)

FOREIGN PATENT DOCUMENTS

CN 1234661 A 11/1999
CN 1323109 A 11/2001
(Continued)

OTHER PUBLICATIONS

3rd Generation Partnership Project (3GPP), R1-073356, "UL Sounding RS Protocol Design for Antenna Selection", Mitsubishi Electric, 3GPP RAN1 #50, Athens, Greece, Aug. 20-24, 2007, 9 pages.
(Continued)

*Primary Examiner* — Ahmed Elallam
(74) *Attorney, Agent, or Firm* — Condo Roccia Koptiw LLP

(57) ABSTRACT

Methods and apparatus for sounding reference signal (SRS) power control for a wireless transmitter/receiver unit (WTRU) are disclosed. These methods and apparatus include methods and apparatus for carrier-specific and carrier-common SRS power control in WTRUs that utilize carrier aggregation techniques. These methods and apparatus also include methods and apparatus for SRS power control in WTRUs utilizing both carrier aggregation and time division multiplexing (TDM) techniques. Additionally, these methods and apparatus include methods and apparatus for SRS power control for WTRUs utilizing multiple input multiple output MIMO operation. Methods and apparatus
(Continued)

for SRS overhead reduction and power management in a WTRU are also disclosed.

10 Claims, 5 Drawing Sheets

Related U.S. Application Data continuation of application No. 16/379,478, filed on Apr. 9, 2019, now Pat. No. 11,323,234, which is a continuation of application No. 14/167,649, filed on Jan. 29, 2014, now Pat. No. 10,298,377, which is a continuation of application No. 12/725,733, filed on Mar. 17, 2010, now Pat. No. 8,724,488.

(60) Provisional application No. 61/160,979, filed on Mar. 17, 2009.

(51) Int. Cl.
　　*H04B 7/06*　　(2006.01)
　　*H04W 52/32*　　(2009.01)
　　*H04W 52/08*　　(2009.01)
　　*H04W 52/10*　　(2009.01)
　　*H04W 52/14*　　(2009.01)
　　*H04W 52/34*　　(2009.01)

(58) Field of Classification Search
　　CPC ... H04W 52/08; H04W 52/10; H04W 52/242; Y02D 30/70
　　See application file for complete search history.

(56) References Cited

U.S. PATENT DOCUMENTS

| | | | |
|---|---|---|---|
| 7,020,072 B1 | 3/2006 | Li et al. |
| 7,466,749 B2 | 12/2008 | Medvedev et al. |
| 8,046,029 B2 | 10/2011 | Teo et al. |
| 8,055,301 B2 | 11/2011 | Teo et al. |
| 8,086,272 B2 | 12/2011 | Teo et al. |
| 8,223,723 B2 | 7/2012 | Teo et al. |
| 8,224,372 B2 | 7/2012 | Pedersen et al. |
| 8,228,858 B2 | 7/2012 | Teo et al. |
| 8,259,700 B2 | 9/2012 | Li et al. |
| 8,259,776 B2 | 9/2012 | Lee et al. |
| 8,274,940 B2 | 9/2012 | Ishii et al. |
| 8,331,297 B2 | 12/2012 | Teo et al. |
| 8,358,614 B2 | 1/2013 | Pani et al. |
| 8,374,076 B2 | 2/2013 | Kim et al. |
| 8,374,213 B2 | 2/2013 | Ro et al. |
| 8,391,190 B2 | 3/2013 | Pan et al. |
| 8,391,911 B2 | 3/2013 | Kishiyama et al. |
| 8,447,345 B2 | 5/2013 | Pedersen et al. |
| 8,472,967 B2 | 6/2013 | Ghosh et al. |
| 8,483,186 B2 | 7/2013 | Teo et al. |
| 8,498,198 B2 | 7/2013 | Kim et al. |
| 8,514,794 B2 | 8/2013 | Zhang et al. |
| 8,521,207 B2 | 8/2013 | Zhang et al. |
| 8,537,729 B2 * | 9/2013 | Hao ............ H04L 5/0091 |
| | | | 370/294 |
| 8,565,168 B2 | 10/2013 | Papasakellariou et al. |
| 8,599,819 B2 | 12/2013 | Kim et al. |
| 8,724,488 B2 | 5/2014 | Shin et al. |
| 8,761,195 B2 * | 6/2014 | Tiirola ........... H04L 27/2613 |
| | | | 370/450 |
| 8,792,584 B2 | 7/2014 | Koo et al. |
| 8,797,923 B2 * | 8/2014 | He ............ H04L 5/0007 |
| | | | 370/280 |
| 8,824,584 B2 | 9/2014 | Kim et al. |
| 8,842,554 B2 | 9/2014 | Mehta et al. |
| 8,908,793 B2 | 12/2014 | Han et al. |
| 8,913,551 B2 | 12/2014 | Mehta et al. |
| 8,913,684 B2 | 12/2014 | Kim et al. |
| 9,025,471 B2 | 5/2015 | Mehta et al. |
| 9,031,052 B2 | 5/2015 | Chung et al. |
| 9,059,749 B2 | 6/2015 | Imamura et al. |
| 9,232,515 B2 | 1/2016 | Papasakellariou et al. |
| 9,655,097 B2 | 5/2017 | Papasakellariou et al. |
| 9,722,681 B2 * | 8/2017 | Ro ............ H04W 72/04 |
| RE46,975 E | 7/2018 | Hooli et al. |
| 10,298,377 B2 | 5/2019 | Shin et al. |
| 11,323,234 B2 | 5/2022 | Shin et al. |
| 2004/0082356 A1 | 4/2004 | Walton et al. |
| 2008/0039098 A1 | 2/2008 | Papasakellariou et al. |
| 2008/0045260 A1 | 2/2008 | Muharemovic et al. |
| 2008/0188260 A1 | 8/2008 | Xiao et al. |
| 2008/0232325 A1 | 9/2008 | Mehta et al. |
| 2008/0268857 A1 | 10/2008 | McCoy et al. |
| 2008/0298497 A1 | 12/2008 | Cho et al. |
| 2008/0317161 A1 | 12/2008 | Pascal |
| 2009/0042615 A1 | 2/2009 | Teo et al. |
| 2009/0042616 A1 | 2/2009 | Teo et al. |
| 2009/0073955 A1 | 3/2009 | Malladi |
| 2009/0109908 A1 | 4/2009 | Bertrand et al. |
| 2009/0181687 A1 | 7/2009 | Tiirola et al. |
| 2009/0196372 A1 | 8/2009 | Zhang et al. |
| 2009/0238241 A1 | 9/2009 | Hooli et al. |
| 2009/0247229 A1 | 10/2009 | Teo et al. |
| 2009/0274110 A1 | 11/2009 | Teo et al. |
| 2009/0279447 A1 | 11/2009 | Mehta et al. |
| 2009/0303955 A1 | 12/2009 | Teo et al. |
| 2009/0323664 A1 | 12/2009 | Li et al. |
| 2010/0002649 A1 | 1/2010 | Teo et al. |
| 2010/0002657 A1 | 1/2010 | Teo et al. |
| 2010/0040005 A1 | 2/2010 | Kim et al. |
| 2010/0040036 A1 | 2/2010 | Ofuji et al. |
| 2010/0067632 A1 | 3/2010 | Jia |
| 2010/0074201 A1 | 3/2010 | Wu |
| 2010/0080187 A1 | 4/2010 | Papasakellariou et al. |
| 2010/0103902 A1 | 4/2010 | Kim et al. |
| 2010/0135273 A1 | 6/2010 | Kim |
| 2010/0172340 A1 | 7/2010 | Muharemovic et al. |
| 2010/0202331 A1 | 8/2010 | Zhang et al. |
| 2010/0215114 A1 | 8/2010 | Kim et al. |
| 2010/0238825 A1 | 9/2010 | Zhang et al. |
| 2010/0246463 A1 | 9/2010 | Papasakellariou et al. |
| 2010/0246638 A1 | 9/2010 | Mehta et al. |
| 2010/0296591 A1 | 11/2010 | Xu et al. |
| 2011/0086644 A1 | 4/2011 | Dahlman et al. |
| 2011/0096707 A1 | 4/2011 | McCoy et al. |
| 2011/0176480 A1 | 7/2011 | Dahlman et al. |
| 2011/0200143 A1 | 8/2011 | Koo et al. |
| 2011/0261716 A1 | 10/2011 | Kim et al. |
| 2011/0310931 A1 | 12/2011 | Mehta et al. |
| 2012/0178502 A1 | 7/2012 | Teo et al. |
| 2013/0016684 A1 | 1/2013 | Attar et al. |
| 2013/0107840 A1 | 5/2013 | Ro et al. |
| 2013/0121290 A1 | 5/2013 | Kim et al. |
| 2013/0178221 A1 | 7/2013 | Jung et al. |
| 2014/0016602 A1 | 1/2014 | Papasakellariou et al. |
| 2014/0036859 A1 | 2/2014 | Ekpenyong et al. |
| 2014/0064218 A1 | 3/2014 | Kim et al. |
| 2014/0341313 A1 | 11/2014 | Kim et al. |
| 2015/0016489 A1 | 1/2015 | Mehta et al. |
| 2016/0119906 A1 | 4/2016 | Papasakellariou et al. |

FOREIGN PATENT DOCUMENTS

| | | |
|---|---|---|
| CN | 1972266 A | 5/2007 |
| CN | 101536588 A | 9/2009 |
| EP | 2129019 A1 | 12/2009 |
| JP | H08-32515 A | 2/1996 |
| JP | 2008-545294 A | 12/2008 |
| JP | 2009-004924 A | 1/2009 |
| KR | 10-2009-0014978 A | 2/2009 |
| WO | 2008/055179 A2 | 5/2008 |
| WO | 2008/084721 A1 | 7/2008 |
| WO | 2008/126655 A2 | 10/2008 |
| WO | 2009/023681 A2 | 2/2009 |

(56) References Cited

FOREIGN PATENT DOCUMENTS

| WO | 2008/156293 A3 | 3/2009 |
|---|---|---|
| WO | 2009/019062 A3 | 4/2009 |

OTHER PUBLICATIONS

3rd Generation Partnership Project (3GPP), R1-080803, "UL Sounding RS Control Signaling for Closed Loop Antenna Selection", Mitsubishi Electric, 3GPP RAN1 #52, Sorrento, Italy, Feb. 11-15, 2008, pp. 1-7.
3rd Generation Partnership Project (3GPP), R1-082807, "CM Analysis of UL Transmission for LTE-A", InterDigital Communications, LLC, 3GPP TSG-RAN WG1 Meeting #54, Jeju, Korea, Aug. 18-22, 2008, pp. 1-8.
3rd Generation Partnership Project (3GPP), R1-084423, "Uplink SU-MIMO Design Options for LTE Advanced", Motorola, 3GPP TSG RAN1#55, Prague, Czech Republic, Nov. 10-14, 2008, pp. 1-4.
3rd Generation Partnership Project (3GPP), R1-090100, "SRS Transmission Issues for LTE-A", Samsung, 3GPP TSG RAN WG1 #55bis, Ljubljana, Slovenia, Jan. 14-18, 2009, pp. 1-3.
3rd Generation Partnership Project (3GPP), R1-090430, "Alignment of RAN1/RAN4 Specification on UE Maximum Output Power", LG Electronics, Ericsson, Panasonic, NTT DoComo, Nokia Siemens Network, Nokia, 3GPP TSG-RAN WG1 Meeting #55bis, Ljubljana, Slovenia, Jan. 12-16, 2009, 9 pages.
3rd Generation Partnership Project (3GPP), R1-090611, "Concurrent PUSCH and PUCCH Transmissions", Samsung, 3GPP TSG RAN WG1 #56, Athens, Greece, Feb. 9-13, 2009, pp. 1-2.
3rd Generation Partnership Project (3GPP), R1-090617, "SRS Transmission Issues for LTE-A", Samsung, 3GPP TSG RAN WG1 #56, Athens, Greece, Feb. 9-13, 2009, pp. 1-3.
3rd Generation Partnership Project (3GPP), R1-090655, "Uplink Multiple Channel Transmission in Case of UE Transmit Power Limitation", LG Electronics, 3GPP TSG RAN WG1#56, Athens, Greece, Feb. 9-13, 2009, pp. 1-3.
3rd Generation Partnership Project (3GPP), R1-090689, "Precoded SRS for LTE-Advanced", Panasonic, 3GPP TSG RAN WG1 Meeting #56, Athens, Greece, Feb. 9-13, 2009, pp. 1-2.
3rd Generation Partnership Project (3GPP), R1-090738, "PUSCH Power Control for LTE-Advanced", Nokia Siemens Networks, Nokia, 3GPP TSG RAN WG1 #56 Meeting, Athens, Greece, Feb. 9-13, 2009, 4 pages.
3rd Generation Partnership Project (3GPP), TS 25.101 V3.19.0, "Technical Specification Group Radio Access Networks, User Equipment (UE) Radio Transmission and Reception (FDD) (Release 1999)", Dec. 2006, pp. 1-66.
3rd Generation Partnership Project (3GPP), TS 25.101 V4.13.0, "Technical Specification Group Radio Access Networks, User Equipment (UE) Radio Transmission and Reception (FDD) (Release 4)", Dec. 2006, pp. 1-66.
3rd Generation Partnership Project (3GPP), TS 25.101 V5.20.0, "Technical Specification Group Radio Access Network, User Equipment (UE) Radio Transmission and Reception (FDD) (Release 5)", Dec. 2006, pp. 1-93.
3rd Generation Partnership Project (3GPP), TS 25.101 V6.18.0, Technical Specification Group Radio Access Network, User Equipment (UE) Radio Transmission and Reception (FDD) (Release 6), Sep. 2008, pp. 1-133.
3rd Generation Partnership Project (3GPP), Ts 25.101 V6.19.0, "Technical Specification Group Radio Access Network, User Equipment (UE) Radio Transmission and Reception (FDD) (Release 6)", Mar. 2009, pp. 1-134.
3rd Generation Partnership Project (3GPP), TS 25.101 V6.8.0, "Technical Specification Group Radio Access Network, User Equipment (UE) Radio Transmission and Reception (FDD) (Release 6)", Jun. 2005, pp. 1-118.

3rd Generation Partnership Project (3GPP), TS 25.101 V7.14.0, "Technical Specification Group Radio Access Network, User Equipment (UE) Radio Transmission and Reception (FDD) (Release 7)", Dec. 2008, pp. 1-172.
3rd Generation Partnership Project (3GPP), TS 25.101 V7.17.0, "Technical Specification Group Radio Access Network, User Equipment (UE) Radio Transmission and Reception (FDD) (Release 7)", Dec. 2009, pp. 1-172.
3rd Generation Partnership Project (3GPP), TS 25.101 V8.5.1, "Technical Specification Group Radio Access Network, User Equipment (UE) Radio Transmission and Reception (FDD) (Release 8)", Jan. 2009, pp. 1-214.
3rd Generation Partnership Project (3GPP), TS 25.101 V8.9.0, "Technical Specification Group Radio Access Network, User Equipment (UE) Radio Transmission and Reception (FDD) (Release 8)", Dec. 2009, pp. 1-217.
3rd Generation Partnership Project (3GPP), TS 25.101 V9.2.0, "Technical Specification Group Radio Access Network, User Equipment (UE) Radio Transmission and Reception (FDD) (Release 9)", Dec. 2009, pp. 1-244.
3rd Generation Partnership Project (3GPP), TS 36.101 V8.5.0, "Technical Specification Group Radio Access Network, Evolved Universal Terrestrial Radio Access (E-UTRA), User Equipment (UE) Radio Transmission and Reception (Release 8)", Mar. 2009, pp. 1-121.
3rd Generation Partnership Project (3GPP), TS 36.101 V8.8.0, "Technical Specification Group Radio Access Network, Evolved Universal Terrestrial Radio Access (E-UTRA), User Equipment (UE) Radio Transmission and Reception (Release 8)", Dec. 2009, pp. 1-160.
3rd Generation Partnership Project (3GPP), TS 36.101 V9.2.0, "Technical Specification Group Radio Access Network, Evolved Universal Terrestrial Radio Access (E-UTRA), User Equipment (UE) Radio Transmission and Reception (Release 9)", Dec. 2009, pp. 1-169.
3rd Generation Partnership Project (3GPP), TS 36.211 V8.6.0, "Technical Specification Group Radio Access Network, Evolved Universal Terrestrial Radio Access (E-UTRA), Physical Channels and Modulation (Release 8)", Mar. 2009, pp. 1-82.
3rd Generation Partnership Project (3GPP), TS 36.211 V8.9.0, "Technical Specification Group Radio Access Network, Evolved Universal Terrestrial Radio Access (E-UTRA), Physical Channels and Modulation (Release 8)", Dec. 2009, pp. 1-83.
3rd Generation Partnership Project (3GPP), TS 36.211 V9.0.0, "Technical Specification Group Radio Access Network, Evolved Universal Terrestrial Radio Access (E-UTRA), Physical Channels and Modulation (Release 9)", Dec. 2009, pp. 1-85.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, pp. 1-74.
3rd Generation Partnership Project (3GPP), TS 36.213 V8.8.0, "Technical Specification Group Radio Access Network, Evolved Universal Terrestrial Radio Access (E-UTRA), Physical Layer Procedures (Release 8)", Sep. 2009, pp. 1-77.
3rd Generation Partnership Project (3GPP), TS 36.213 V9.0.1, "Technical Specification Group Radio Access Network, Evolved Universal Terrestrial Radio Access (E-UTRA), Physical Layer Procedures (Release 9)", Dec. 2009, pp. 1-79.
3rd Generation Partnership Project (3GPP), TS 36.300 V8.11.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2009, pp. 1-148.
3rd Generation Partnership Project (3GPP), TS 36.300 V8.7.0, "Technical Specification Group Radio Access Network, Evolved Universal Terrestrial Radio Access (E-UTRA) and Evolved Universal Terrestrial Radio Access Network (E-UTRAN), Stage 2 (Release 8)", Dec. 2008, pp. 1-144.
3rd Generation Partnership Project (3GPP), TS 36.300 V9.2.0, "Technical Specification Group Radio Access Network, Evolved Universal Terrestrial Radio Access (E-UTRA) and Evolved Uni-

(56) References Cited

OTHER PUBLICATIONS versal Terrestrial Radio Access Network (E-UTRAN), Overall Description, Stage 2 (Release 9)", Dec. 2009, pp. 1-178.

3rd Generation Partnership Project (3GPP), TS 36.331 V8.4.0, "Technical Specification Group Radio Access Network, Evolved Universal Terrestrial Radio Access (E-UTRA) Radio Resource Control (RRC), Protocol Specification (Release 8)", Dec. 2008, pp. 1-198.

3rd Generation Partnership Project (3GPP), TS 36.331 V8.8.0, "Technical Specification Group Radio Access Network, Evolved Universal Terrestrial Radio Access (E-UTRA) Radio Resource Control (RRC), Protocol Specification (Release 8)", Dec. 2009, pp. 1-211.

3rd Generation Partnership Project (3GPP), TS 36.331 V9.1.0, "Technical Specification Group Radio Access Network, Evolved Universal Terrestrial Radio Access (E-UTRA) Radio Resource Control (RRC), Protocol Specification (Release 9)", Dec. 2009, pp. 1-233.

\* cited by examiner

METHOD AND APPARATUS FOR POWER CONTROL OF SOUNDING REFERENCE SIGNAL (SRS) TRANSMISSION

CROSS REFERENCE TO RELATED APPLICATIONS

This application is a continuation of U.S. patent application Ser. No. 17/716,570, filed Apr. 8, 2022, which is a continuation of 16/379,478, filed Apr. 9, 2019, which issued as U.S. Pat. No. 11,323,234, which is a continuation of U.S. patent application Ser. No. 14/167,649, filed Jan. 29, 2014, which issued as U.S. Pat. No. 10,298,377 on Apr. 21, 2019, which is a continuation of U.S. Patent Application No. 12/725,733, filed Mar. 17, 2010, which issued as U.S. Pat. No. 8,724,488 on May 13, 2014, and claims the benefit of U.S. Provisional Application No. 61/160,979, filed Mar. 17, 2009 all of which are incorporated by reference as if fully set forth herein.

FIELD OF INVENTION

This application is related to wireless communications.

BACKGROUND

In order to support higher data rate and spectrum efficiency, the Third Generation Partnership Project (3GPP) introduced improvements to long term evolution (LTE).

In LTE (i.e., LTE release 8/9), Single Carrier Frequency Division Multiple Access (SC-FDMA) transmission was selected for uplink (UL) direction. The specific implementation is based on Discrete Fourier Transform Spread Orthogonal Frequency Division Multiplexing (DFT-S-OFDM). For the purpose of this application, either term may be used interchangeably. A wireless transmit/receive unit (WTRU) in the UL will transmit only on a limited, contiguous set of assigned sub-carriers in an FDMA arrangement. Only for illustration purposes, if the overall OFDM signal or system bandwidth in the UL is composed of useful sub-carriers numbered 1 to 100, a first given WTRU would be assigned to transmit its own signal on sub-carriers 1-12, a second given WTRU would transmit on sub-carriers 13-24, and so on. An evolved NodeB (eNodeB or eNB) would receive the composite UL signal across the entire transmission bandwidth from one or more WTRUs at the same time, but each WTRU would only transmit into a subset of the available transmission bandwidth. DFT-S OFDM in the LTE UL was selected by 3GPP Radio Layer 1 (RANI) as a form of OFDM transmission with the additional constraint that the time-frequency resource assigned to a WTRU must consist of a set of frequency-consecutive sub-carriers. In the LTE UL, there is no DC sub-carrier (unlike the downlink (DL)). Frequency hopping may be applied in one mode of operation to UL transmissions by a WTRU.

WTRUs transmit their UL data (and in some cases their control information) on the physical uplink shared channel (PUSCH). The transmission of the PUSCH is scheduled and controlled by the eNodeB using the so-called uplink scheduling grant, which is carried on physical downlink control channel (PDCCH) format 0. As part of the uplink scheduling grant, the WTRU receives control information on the modulation and coding set (MCS), transmit power control (TPC) command, uplink resources allocation (i.e., the indices of allocated resource blocks), etc. Then, the WTRU will transmit its PUSCH on allocated uplink resources with corresponding MCS at transmit power controlled by the TPC command.

Similar to LTE DL, reference signals for channel estimation are also needed for the LTE UL to enable coherent demodulation of PUSCH (or PUCCH) at the eNodeB. These reference signals are referred to as UL demodulation reference signals (DRS). They are always transmitted together with and covering the same frequency band as PUSCH (or PUCCH).

In order to allow for the eNodeB to estimate UL channel quality for UL scheduling, sounding reference signals (SRS) may be transmitted in UL, not associated with transmission of PUSCH and PUCCH. In the frequency domain, SRS transmissions may cover the frequency band that is of interest for the frequency domain scheduling. When an SRS is to be transmitted in a subframe, it occupies the last SC-FDMA symbol of the subframe. If a WTRU is transmitting SRS in a certain subframe, then the last symbol of the subframe is then not used for PUSCH transmission by any WTRU within the cell.

In order for the eNodeB to perform reliable channel estimation for frequency-scheduling for each UL, the transmit power for SRS (and other channels) is controlled. LTE methods may not account for SRS transmission where UL Multiple Input Multiple Output (MIMO) and carrier aggregations techniques are utilized. UL MIMO and carrier aggregation may also effect the determination of SRS parameters and power settings.

SUMMARY

Example embodiments of the present application include methods and apparatus for sounding reference signal (SRS) power control for a wireless transmitter/receiver unit (WTRU). These example embodiments include methods and apparatus for carrier-specific and carrier-common SRS power control in WTRUs that utilize carrier aggregation techniques, as well as methods and apparatus for SRS power control in WTRUs utilizing both carrier aggregation and time division multiplexing (TDM) techniques. Additionally, these example embodiments include methods and apparatus for SRS power control for WTRUs utilizing multiple input multiple output MIMO operation. Further example embodiments include methods and apparatus for SRS overhead reduction and power management in a WTRU.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved NodeB (eNodeB or eNB), a site controller, an access point (AP), or any other type of interfacing device capable of operating in a wireless environment.

Figure 1:
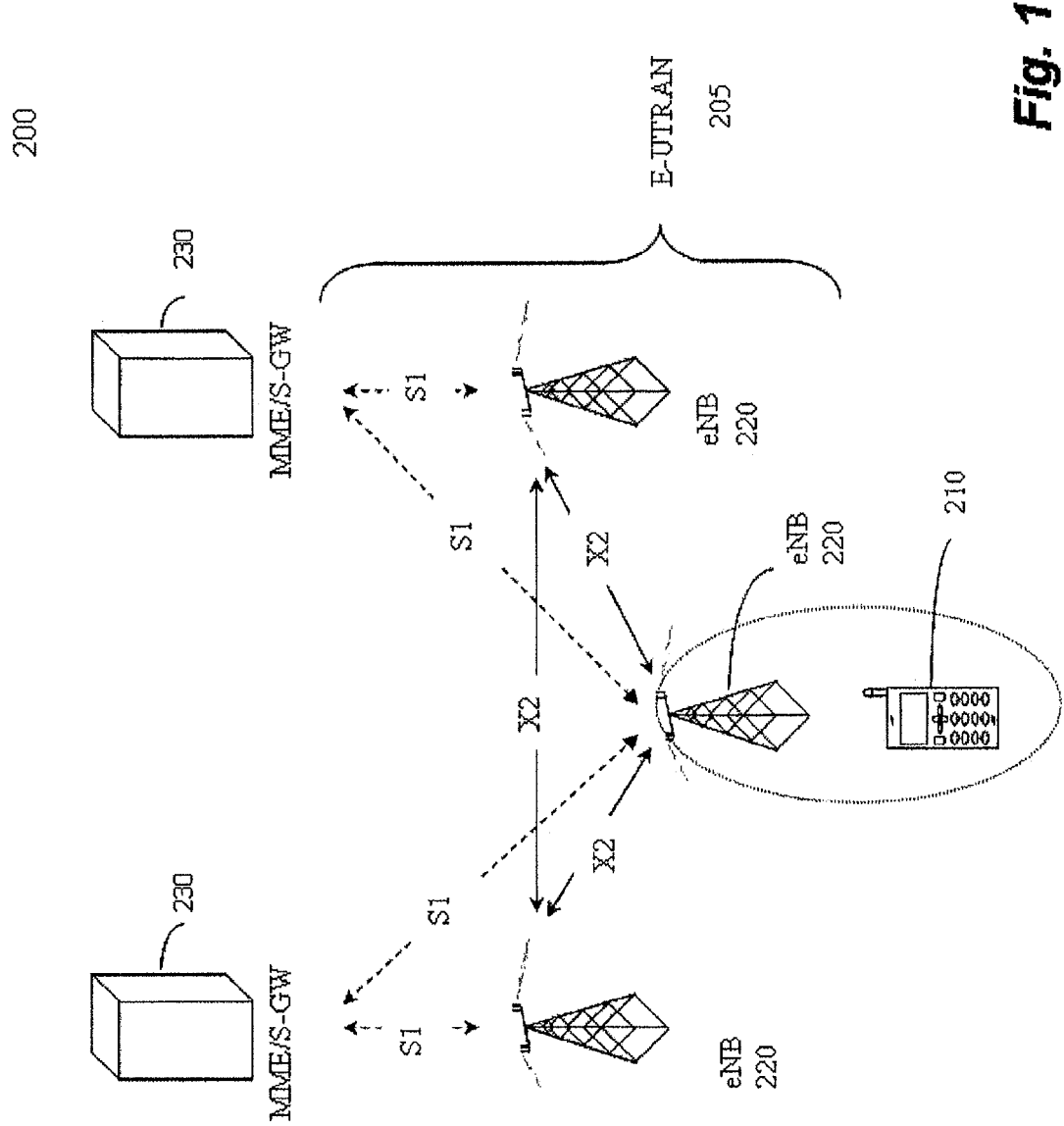
FIG. 1 shows a Long Term Evolution (LTE) wireless communication system/access network.

FIG. 1 shows a Long Term Evolution (LTE) wireless communication system/access network 200 that includes an Evolved-Universal Terrestrial Radio Access Network (E-UTRAN) 205. The E-UTRAN 205 includes several evolved Node-Bs, (eNBs) 220. The WTRU 210 is in communication with an eNB 220. The eNBs 220 interface with each other using an X2 interface. Each of the eNBs 220 interface with a Mobility Management Entity (MME)/Serving GateWay (S-GW) 230 through an S1 interface. Although a single WTRU 210 and three eNBs 220 are shown in FIG. 2, it should be apparent that any combination of wireless and wired devices may be included in the wireless communication system access network 200.

Figure 2:
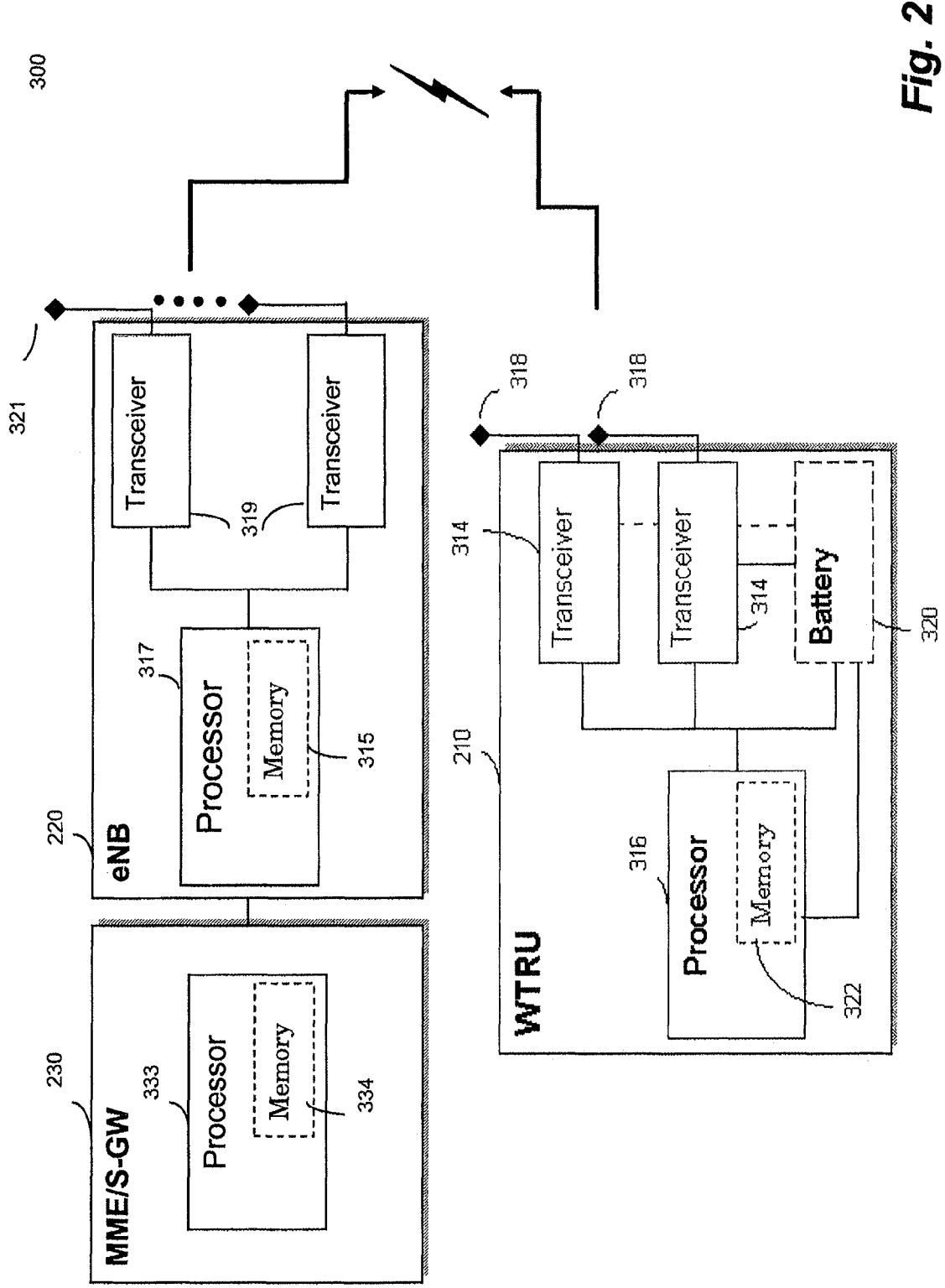
FIG. 2 is a block diagram of an LTE wireless communication system.

FIG. 2 is an example block diagram of an LTE wireless communication system 300 including the WTRU 210, the eNB 220, and the MME/S-GW 230. As shown in FIG. 2, the WTRU 210, the eNB 220 and the MME/S-GW 230 are configured to perform a method of SRS transmission with MIMO and carrier aggregation techniques.

In addition to the components that may be found in a typical WTRU, the WTRU 210 includes a processor 316 with an optional linked memory 322, at least one transceiver 314, an optional battery 320, and an antenna 318. The processor 316 is configured to perform a method of SRS transmission with MIMO and carrier aggregation techniques. The transceivers 314 are in communication with the processor 316 and antennas 318 to facilitate the transmission and reception of wireless communications. In case a battery 320 is used in the WTRU 210, it powers the transceivers 314 and the processor 316.

In addition to the components that may be found in a typical eNB, the eNB 220 includes a processor 317 with an optional linked memory 315, transceivers 319, and antennas 321. The processor 317 is configured to support SRS functionality with (MIMO) and carrier aggregation techniques. The transceivers 319 are in communication with the processor 317 and antennas 321 to facilitate the transmission and reception of wireless communications. The processor is generally configured to: i) determine which WTRUs will be transmitting SRS, ii) determine each WTRU's allocation in frequency and time for SRS transmission, as well as the type of SRS transmission and communicate this information to the WTRUs, iii) receive the SRS measurement information and iv) process the SRS information and inform the scheduler (also residing in the processor 317) so that the scheduler can make scheduling decisions. (e.g. assign UL resources to the WTRU). The eNB 220 is connected to the Mobility Management Entity/Serving GateWay (MME/S-GW) 230 which includes a processor 333 with an optional linked memory 334.

In LTE (i.e., LTE release 8/9), there is a single transmission of PUCCH, PUSCH, or Sounding Reference Signals (SRSs) with a single antenna and a single carrier. The WTRU does not transmit SRS whenever SRS and PUCCH format 2/2a/2b transmission happen to coincide in the same subframe. The WTRU does not transmit SRS whenever SRS and acknowledge/negative acknowledge (ACK/NACK) and/or positive SRS transmissions happen to coincide in the same subframe unless the parameter Simultaneous-AN-and-SRS is true. The parameter Simultaneous-AN-and-SRS provided by a higher layer determines if a WTRU is configured to support the transmission of ACK/NACK on PUCCH and SRS in one subframe. If it is configured to support the transmission of ACK/NACK on PUCCH and SRS in one subframe, then in the cell specific SRS subframes WTRU shall transmit ACK/NACK and SR using the shortened PUCCH format, where the ACK/NACK or the SR symbol corresponding to the SRS symbol is punctured.

In LTE, in order for the eNodeB to perform reliable channel estimation for frequency-scheduling for each UL, the transmit power for SRS (and other channels) is controlled. The functional requirement for the WTRU to support power control (PC) for SRS is included below. The setting of the WTRU Transmit power $P_{SRS}$ for the Sounding Reference Symbol transmitted on subframe i is defined by $$P_{SRS}(i) = \min\{P_{MAX}, P_{SRS\_OFFSET} + 10\log_{10}(M_{SRS}) + P_{O\_PUSCH}(j) + \alpha \cdot PL + f(i)\} \text{ [dBm]} \quad \text{Eq. 1}$$

where:
For $K_S=1.25$, $P_{SRS\_OFFSET}$ is a 4-bit WTRU specific parameter semi-statically configured by higher layers with 1 dB step size in the range [−3, 12] dB.
For $K_S=0$, $P_{SRS\_OFFSET}$ is a 4-bit WTRU specific parameter semi-statically configured by higher layers with 1.5 dB step size in the range [−10.5,12] dB.
$M_{SRS}$ is the bandwidth of the SRS transmission in subframe i expressed in number of resource blocks.
f(i) is the current power control adjustment state for the PUSCH.
$P_{O\_PUSCH}(j)$ is a parameter, where j=1.

The WTRU transmission must satisfy requirements to meet out of band emission standards (e.g. Adjacent Channel Leakage Ratio (ACLR)) and in-band signal fidelity requirements; e.g. Error Vector Magnitude (EVM). Typically, power amplifiers must be operated in linear or near-linear range to maintain acceptable levels of out of band emissions and the degree of linearity is impacted by the specific characteristics of the waveform. Historically, Peak to Average Power Ratio (PAPR) had been used as a figure of merit for predicting a waveform's impact on out of band emissions. In 3GPP, cubic metric (CM) has been considered and adopted to better reflect the waveform's impact on required power amplifier back-off than does the PAPR. The following equation can be the definition of CM:

$$CM = [20*\log 10((v\_norm\ 3)rms) - 20*\log 10((v\_norm\_ref\ 3)rms)]/1.85 \quad \text{Eq. 2}$$

where v_norm is the normalized voltage waveform of the input signal and v_norm_ref is the normalized voltage waveform of the reference signal (12.2 kbps AMR Speech) and $$20*\log 10((v\_norm\_ref\ 3)rms) = 1.52 \text{ dB} \quad \text{Eq. 3}$$

For example, using the above CM formula, Table 1 shows the 90% cdf (cumulative density function) value of the CM for certain transmission scenarios. It should be noted that the CM results in OFDMA in the table are shown for reference. As seen in the table, the CM varies with the number of discontinuities in allocated radio bears (RBs or subcarriers), modulation type, etc. For instance, the CM of clustered DFT-S-FDMA (e.g., non-contiguous RB allocation) with quadrature phase-shift keying (QPSK) and up to 5 clusters is increased by more than 1.3 dB relative to SC-FDMA for QPSK where QPSK is likely to be used for cell edge WTRUs. Even though for the CM analysis the same power for all RBs was assumed, the CM may be also a function of power ratios among different RBs (particularly, in non-contiguous transmissions) and the number of transmit antennas. In future LTE releases in the UL, PUSCH and PUCCH may be transmitted at the same time (and non-contiguous RB allocation may also be allowed). Under these transmission conditions the total transmitted signal waveform no longer has the property of SC-FDMA. This will cause the CM (or PAPR) of the total transmitted signal to increase. In particular, in case of concurrent PUSCH and PUCCH transmissions in the same subframe, the power levels for PUSCH and PUCCH, respectively, are very likely to be different, as their power settings are independent. In that case, the resulting CM may be increased by as high as 2 dB more than SC-FDMA with QPSK.

In these cases, it may be necessary to deal with the increased CM of the two simultaneous transmissions for the WTRU to meet its transmission requirements (e.g., EVM and ACLR requirements). The increase of the CM of UL signals may require a WTRU power amplifier to back-off of maximum transmit power to meet transmission requirements. This is equivalent to applying a back-off to Pcmax (or Pumax). Back-off may be a function of the number of non-contiguous allocated RBs (or RBGs), power ratio(s) of RBs (or channels), modulation type, etc. Such back-off may be implemented in WTRU. Alternatively, eNodeB may provide the information for each WTRU.

TABLE 1

90% value of the cdf of the CM

| | SC-FDMA | Clustered DFT-S-FDMA | OFDMA |
|---|---|---|---|
| QPSK | 1.05 dB | 2.39 dB | 3.38 dB |
| 16 QAM | 1.83 dB | 2.69 dB | 3.38 dB |
| 64 QAM | 1.98 dB | 2.76 dB | 3.38 dB |

Future LTE releases may also support SRS transmissions in multiple transmit antennas and carrier aggregation. The WTRU SRS procedure and the functional requirements for power control must be modified to support these additional features.

In LTE, SRS is not transmitted with multiple transmit antennas, but is sent using a single antenna in every assigned SRS subframe. Also, SRS is never transmitted over multiple component carriers, but is sent using a single carrier all the time. In addition, if a WTRU is transmitting SRS in a certain subframe, then other channels (e.g., PUCCH and PUCCH) are not transmitted simultaneously in the same SC-FDMA symbol as the SRS is sent (i.e., the last symbol of the subframe).

Future releases of LTE UL will likely support two new key features, multiple input multiple output (MIMO) (with up to 4 WTRU transmit antennas) and carrier aggregation. It will be possible to have SRS transmissions in multiple carriers and/or from multiple transmit antennas in a certain subframe. SRS can be defined per WTRU antenna port. However, in an SM (Spatial multiplexing) MIMO mode, the SRS may be pre-coded and layer specific—e.g., transmit from 4 antennas, but only 2 antenna ports (1 per spatial layer of the anticipated data transmissions). If the SRS transmission configuration (including SRS resource allocation, SRS parameters, and power setting) is done improperly, the overall UL transmission system will not function properly and transmission specifications will not be met.

In particular, overhead for sounding reference signals is a particular concern as the number of transmit antennas grows (e.g., up to 4). Hence it is desirable to have a SRS design that incurs a low overhead. For example, the SRS will be transmitted sparsely and preferably only when needed. In addition, preferably the overhead is only seen by the WTRU benefiting from it and possibly dynamic enough to permit good scheduler flexibility.

In UL MIMO. orthogonal SRSs for a given WTRU have desirable properties, but come with potentially heavy overhead. Non-orthogonal SRSs may also be used. If both types of SRSs are used, WTRU must distinguish between them and may have different interpretations/definitions of UL CSI depending on the SRS type. In addition, as SRS will be present in LTE backward compatible subframes/carrier(s), it may be resource efficient to use (at least some of) the subframes for SRS transmissions.

Simultaneous UL transmission of control signaling on PUCCH and data on PUSCH may also be possible within the same component carrier in the same subframe. It may be possible to have PUSCH, PUCCH, and SRS transmitted in the same subframe. In this case, a multiplexing rule may be defined among the channels.

The following SRS parameters are defined in LTE as WTRU-specific semi-statically configurable by higher layers: i) Transmission comb, ii) Starting physical resource block assignment, Duration of SRS transmission: single or indefinite (until disabled), iv) SRS configuration index $I_{SRS}$ for periodicity and SRS subframe offset, v) SRS bandwidth, vi) Frequency hopping bandwidth and vii) Cyclic shift.

When antenna selection is enabled for a WTRU that supports transmit antenna selection, the index of the WTRU antenna that transmits the SRS at a time is determined based on several parameters including the time index, hopping enabled/disabled, etc.

For MIMO the number of SRSs for a WTRU may be as large as number of transmit antennas or antenna ports (WTRU specific). In another embodiment, the number of SRSs and/or transmit antenna specific SRS parameters may be configured by higher layer signaling or L1/2 signaling (i.e., in PDCCH) per WTRU or per group of WTRUs in a cell. If they are signaled in PDCCH, a new DCI format may be required to support the signaling. For instance, to request (or schedule) an aperiodic SRS transmission with multiple antennas, a SRS request bit may be included in PDCCH. Such a configuration may associate SRS transmissions on a per antenna or per layer basis.

For carrier aggregation the choice of which of the carriers SRS is sent on also needs to be signaled. The WTRU may simultaneously transmit SRS on all of its configured carriers. In another embodiment the WTRU may selectively transmit on a subset of its carrier. In another embodiment, the WTRU may transmit only on one carrier at a time. UL carrier specific SRS parameters may be configured by higher layer signaling or L1/2 signaling (i.e., in PDCCH) per WTRU or per group of WTRUs in a cell. Also subband SRSs may be controlled across multiple carriers or per carrier. For instance, a UL anchor carrier may have wideband SRS transmission, while other non-anchor carrier may use narrow band SRS transmission.

In addition, as future releases of LTE, the UL may support non-contiguous resource allocations (i.e., cluster based DFT-OFDMA) within a component carrier, SRS resource allocation should be flexible enough to cover at least the frequency band of interest for the frequency domain scheduling, e.g., more possible SRS bandwidths. Downlink signaling (e.g., PDCCH) may also need to support new parameters for SRS transmission.

The transmit power control for SRS basically follows that of PUSCH, compensating for the exact bandwidth (BW) of the SRS transmission, in the sense that several key power control (PC) parameters for SRS, including $P_{O\_PUSCH}(j)$, f(i), and α, are the same as for PUSCH power control. A number of issues must be addressed which go beyond the current LTE standards. Some of these are described below.

Taking into account the fact that future LTE releases may support simultaneous PUSCH/PUCCH in a subframe, it may be possible that an SRS is scheduled at the end of a PUSCH and that the combined required powers of the SRS and the PUCCH may exceed the value of $P_{MAX}$.

With UL MIMO (e.g., up to four antennas), if simultaneous SRS transmissions over multiple transmit antennas occur, the transmit power density of SRS gets lower as the number of antennas increases, which may degrade the channel estimation at the eNodeB. There may also be various MIMO options (including SM MIMO, transmitter (Tx) diversity, and beamforming (BF)/single antenna port transmission) for PUSCH transmission. SRS transmission with multiple antennas may also be deterministic (or semi-static). In that case, different $P_{SRS\_offset}$ values may be required for different MIMO options for PUSCH, e.g., depending on SRS transmissions on per antenna or per layer (possibly precoded). When the computed SRS power exceeds the maximum power, $P_{MAX}$, a proper WTRU procedure is required. For instance, transmit antenna dropping technique, SRS bandwidth adjustment, SRS power reduction over multiple antennas, etc.

In the frequency domain, SRS transmissions should cover the frequency band that is of interest for the frequency-domain scheduling and that is sufficiently wideband for sounding. However, a wideband SRS transmission may lead to a relatively low received power density, which may degrade the channel quality estimation at the eNodeB. This would be much worse in UL carrier aggregation where multiple carriers are aggregately used for UL transmission.

In UL carrier aggregation, the maximum WTRU power for SRS transmission may be defined per component carrier. The following basic overhead reduction and power setting approaches provide for SRS transmission with multiple antennas and carrier aggregation.

SRS overhead reduction/management techniques can be applied in UL MIMO and/or carrier aggregation. For example, the SRS may be transmitted sparsely (in time and/or frequency domain) and preferably only when needed (i.e., aperiodic or scheduled SRS transmission possibly with a SRS request bit from the eNB). In addition, preferably the overhead is only seen by the WTRU benefiting from it and possibly dynamic enough to permit good scheduler flexibility.

SRS may be defined/configured per WTRU antenna port (e.g., {0, 1, 2, 3}) and/or per UL carrier. In a SM MIMO mode, the SRS may be layer specific—e.g., transmit from 4 antennas, but only 2 antenna ports (1 per spatial layer of the anticipated data transmissions). In UL (SU)-MIMO, orthogonal SRSs for a given WTRU have a desirable property, but come with potentially heavy overhead. The orthogonality property of SRSs in future LTE releases may be achieved through time division multiplexing (TDM), frequency division multiplexing (FDM), and/or code division multiplexing (CDM) techniques. It is understood that two or more of the above techniques may be combined such as TDM+CDM, TDM+FDM, CDM+FDM, etc.

In a CDM embodiment, different phase rotations (i.e., cyclic shifts) may be used to generate orthogonal SRSs for multiple transmit antennas. In this case, by assigning different cyclic shifts to different antennas, simultaneous SRS transmissions from multiple transmit antennas may be performed. However, the SRSs should span the same frequency band, in order to maintain orthogonality. Alternatively, orthogonally coded SRS (using orthogonal cover codes) are simultaneously transmitted from each of the UL Tx antennas (many classes of orthogonal and quasi-orthogonal codes could be used here). Different sets of phase rotations may be assigned to different WTRUs, so that SRS transmissions from different WTRUs are also orthogonal each other.

In an FDM embodiment, SRS transmissions over different antenna ports (or layers) may be carried out in different frequency/time resource grids. This does not require the transmissions to cover identical frequency bands (or SRS bandwidth). That is, different SRS frequency bandwidths may be configured for each antenna port (or layer).

The above FDM embodiment may be implemented as follows. Interlaced SRS can be used. In this embodiment, each of the antennas transmit only on a subset of the tones/subcarriers assigned to the SRS transmission. (e.g. for an SRS configured to transmit over the whole PUSCH region on every tone for a WTRU with 4 Tx antennas, the $1^{st}$, $5^{th}$, $9^{th}$, . . . tones/subcarriers are assigned to be transmitted from antenna 1, the $2^{nd}$, $6^{th}$, $10^{th}$ . . . . Tones/subcarriers are assigned to be transmitted from antenna 2, and so on.) Note that the antenna assignment may also be subframe number (SFN) dependent, so that there is a rotation (hopping) of the tones used for each antenna (e.g. in TTI1 antenna 1 uses tones 1, 5, 9, . . . and in TTI2 antenna 1 uses tones 2, 6, 10).

In a TDM embodiment, the WTRU transmits SRSs from different transmit antennas, using different subframe offsets. This may be configured by higher layers. Alternatively SRS for antenna port n (or layer n), n=0, 1, 2, . . . Nt, is transmitted in SRS subframe x, for example, satisfying mod(x, Nt)=n. Alternatively, SRS transmission may take place in the last two SC-FDMA or DFT-Spread-OFDMA symbols (alternatively, the last SC-FDMA symbol in each slot in a given SRS subframe.). If two Tx antennas are used at the WTRU, then one of the SRS configuration is SRS for one antenna is transmitted in the last symbol; while the SRS for the other antenna is transmitted in the second last symbol. If four Tx antennas are used at the WTRU, then one of the SRS configuration is SRSs for two Tx antennas are transmitted in the last symbol; while the SRSs for the other two antennas are transmitted in the second last symbol.

For backward compatibility, WTRUs that only support a single transmit antenna must also be supported. Backward compatibility may be achieved by the TDM technique as described above, such as one SRS transmission over a single antenna port (or layer) only in a given SRS subframe. Alternatively legacy LTE WTRUs may operate simultaneously with future LTE release WTRUs utilizing1VIIMO techniques such that legacy WTRUs transmit SRS as defined in LTE, while future LTE release WTRUs transmit SRS in LTE backward compatible carrier(s).

If the WTRU only supports a single transmit antenna, the WTRU can share the same resource allocations as for LTE, including SRS subframes, SRS frequency region, other SRS parameters, etc. If the WTRU supports multiple transmit antennas, the WTRU may use the same SRS subframes as for LTE SRS, but additional SRS resources (including SRS bandwidth) may be shared via one of the above proposed multiplexing techniques. For instance, future LTE releases may have SRSs that are transmitted using the above TDM technique (e.g., one SRS at a time), but more frequently (like every 2 msec, 4, 6, 8, or even 10 msec). For example, in the case of SRS transmissions over 4 antenna ports and with 10 msec SRS period, the SRS cycle time (to transmit all 4 SRSs) is 40 msec.

A carrier subset SRS transmission technique may be used. In a carrier subset SRS transmission scenario only a subset of UL carriers transmit SRS for antenna ports for a given time interval (e.g., transmit time interval (TTI), frame, subframe . . . ). A cycle of subsets should cover all UL carriers in a specified period. Suppose for example there are five UL carriers. Subset cycle A may be transmitting the following carrier subsets in SRS subframes:

[Carrier1U, Carrier2U], [Carrier3U, Carrier4U], Carrier5U, Carrier1U], [Carrier2U, Carrier3U] and [Carrier4U, Carrier5U].

Subset cycle B may be:

[Carrier1U, Carrier2U, Carrier3U], [Carrier4U, Carrier5U, Carrier1U], [Carrier2U, Carrier3U, Carrier4U], [Carrier5U, Carrier1U, Carrier2U] and [Carrier3U, Carrier4U, Carrier5U].

Other cycles/subsets may also be used. Cycles and subsets may be predetermined, configurable or signaled.

A carrier subset SRS transmission with subset overlap can also be used. In a carrier subset SRS transmission with subset overlap scenario only a subset of UL carriers transmit SRS for antenna ports for a given time interval (e.g., transmit time interval (TTI), frame, subframe . . . ). Carrier subsets may overlap with each other. The subset overlap may be used to enhance those carriers that are overlapped between subsets. A cycle of subsets should cover all UL carriers in a specified period. Suppose for example there are five UL carriers. Subset cycle A may be:

[Carrier1U, Carrier2U], [Carrier2U, Carrier3U], [Carrier3U, Carrier4U] and [Carrier4U, Carrier5U].

Subset cycle B may be:

[Carrier1U, Carrier2U, Carrier3U], [Carrier3U, Carrier4U, Carrier5U].

Other cycles/subsets/overlaps may also be used. Cycles/subsets/overlaps may be predetermined, configurable or signaled.

A hybrid carrier subset/whole set SRS transmission with/without subset overlap can also be used. In such a hybrid scenario, in a first set of SRS subframes (say SRS subframes A) all UL carriers transmit SRS for antenna ports and in a second set of SRS subframes (say SRS subframes B) only a subset of UL carriers transmit SRS for antenna ports. Carrier subsets may or may not overlap with each other. A cycle of carrier subsets that transmit SRS in SRS subframe B should cover all UL carriers in a specified period. Suppose for example there are five UL carriers. SRS subframe A may be:

[Transmit SRS for all carriers], [Carrier1U], [Carrier2U], [Carrier3U], [Carrier4U] and [Carrier5U].

SRS subframe B may be:

Transmit SRS for a carrier subset of Carrier1U, Carrier2U, Carrier3U, Carrier4U and Carrier5U.

SRS subframe A may be used to obtain complete information (e.g., channel state information (CSI)) for SRS transmission for all carriers or a subset of carriers and/or from all antennas/antenna ports/layers or a subset of antennas/antenna ports/layers. SRS subframe A may serve a special purpose e.g., when carrier subset SRS transmission may have delay in obtaining a complete information for all carriers. SRS subframe A may be periodic and the periodicity may be configurable. SRS subframe A may be transmitted in every N subframes. SRS subframe A may also be aperiodic. SRS may be transmitted based on an SRS aperiodic request. Such an aperiodic request may be triggered by L1 control channel (e.g., PDCCH), or higher layer signaling (e.g., radio resource controller (RRC) signaling).

Alternatively, non-orthogonal SRSs may also be considered. If both types of SRSs are configured, WTRU needs to be able to distinguish between them and possibly have different interpretations/definitions of UL CSI depending on the SRS type.

For SRS transmission in a mixed LTE release scenario, to maintain backward compatibility with LTE WTRUs, the same parameters can be configured to the future LTE release WTRU. In addition, the LTE SRS procedure is applied also for the WTRU. However, in a given subframe, the number of simultaneous SRSs which the WTRU may transmit over multiple antennas (or antenna ports) is limited to N (e.g., N=2). If the number of antennas is greater than the allowable limit, N, then SRSs from different antennas may be TDM (e.g., different subframes).

For SRS transmission in a pure future LTE release scenario, SRSs from multiple antennas may be multiplexed using the multiplexing techniques mentioned above.

SRS transmissions can also occur in a multiple carrier scenario. From a DL signaling overhead point of view, a common set of SRS parameters can be applied to all the assigned UL carriers, including subframe offset, SRS transmission periodicity, SRS bandwidth, etc. However, as the number of UL carriers simultaneously carrying SRSs increases, the SRS transmit power density for each carrier get lower, which may degrade the UL channel quality estimation. Accordingly, the number of simultaneous SRS transmissions over multiple carriers can be determined based on the WTRU transmit power available for SRS (e.g., power headroom). Alternatively, SRS parameters may be configured for the individual carriers. In this case, some parameters for a carrier may be implicitly determined from the SRS parameters configured for other carrier(s).

In LTE, a WTRU does not transmit SRS whenever SRS and PUCCH format 2/2a/2b transmissions happen to coincide in the same subframe. However, in multicarrier transmissions, a WTRU may transmit SRS in the same subframe over other carrier(s), if the carrier(s) does not carry PUCCH at that time.

A UL anchor carrier may be used to transmit PUCCH. In this embodiment all PUCCH may be transmitted in one UL carrier and not transmitted in other UL carriers. For example, a UE specific UL CC is configured semi-statically for carrying all PUCCH. SRS may be transmitted in other UL carriers in the same subframe but not in UL anchor carrier (or UE specific UL carrier) carrying PUCCH. For example, if an anchor carrier is denoted as Carrier1U. Non-anchor carriers are denoted as Carrier2U, Carrier3U, Carrier4U and Carrier5U. PUCCHs are transmitted in Carrier1U using format 2/2a for normal CP (or format2b for extended CP). SRSs are transmitted in non-anchor carriers, namely Carrier2U, Carrier3U, Carrier4U and Carrier5U in the same subframe. Alternatively, when SRS and PUCCH format 2/2a/2b transmissions happen to coincide in the same subframe on a UL carrier, the WTRU may transmit the corresponding UCI bits on PUSCH on a UL carrier (i.e., fallback to Rel8 UCI transmission on PUSCH).

More than one UL anchor carrier may be used. In this embodiment PUCCHs may be transmitted in two or more UL anchor carriers while SRSs may be transmitted in non-anchor carriers simultaneously if PUCCHs format2/2a/2b are used. For example, if anchor carriers are denoted as Carrier1U and Carrier2U. Non-anchor carriers are denoted as Carrier3U, Carrier4U and Carrier5U. PUCCHs are transmitted in Carrier1U and Carrier2U using format 2/2a for normal cyclic prefix (CP) (or format2b for extended CP). SRSs are transmitted in non-anchor carriers, namely Carrier3U, Carrier4U and Carrier5U in the same subframe.

SRS overhead can be reduced by introducing an "SRS Activation" field in UL scheduling assignment (SA) and then using UL SAs to configure new SRS transmissions or re-configure existing SRS transmissions in UL component carriers. Additional detail is needed to address how SRSs are mapped to multiple transmit antennas and/or multiple component carriers.

In one embodiment, carrier specific SRS mapping/configuration can be used. Such carrier specific SRS mapping may be configured in a dynamic manner or semi-statically. For example, each UL component carrier may have different SRS parameters. For example, a UL component carrier on which PUSCH is scheduled may have a shorter SRS periodicity and/or a wider SRS bandwidth than an inactive UL component carrier.

In another embodiment, UL MIMO (transmit) mode dependent SRS transmission can be used. Depending on the UL MIMO mode (like Tx diversity or beamforming or single antenna port transmission mode vs SM MIMO), the SRS transmission scheme (e.g., SRS parameters) varies to maintain SRS signaling overhead. For example, in case of non-SM MIMO, for example single antenna port transmission mode, the WTRU is configured to have different SRS parameters for multiple antennas such that SRS transmission from the antenna(s) (or antenna port) used for single antenna port transmission occurs more frequently and/or wider than SRS transmission from the antenna(s) (or antenna port(s)) not in use.

In another embodiment, preconfigured SRS mapping by higher layers can be used. In this case, the eNB simply signals which configuration to be used.

Several variations can be used (mostly WTRU specific). Such approaches may be static, semi-static, or dynamic. Some may be scheduled or event driven. Each approach has different advantages such as low SRS overhead or low SRS control signaling overhead as discussed in detail below.

The number of SRSs for a WTRU is equal to the number of transmit antennas or antenna ports (WTRU specific). Alternatively, the number of SRSs can be configured by higher layer signaling or L1/2 signaling (i.e., in PDCCH) per WTRU or per group of WTRUs in a cell. If it is signaled in PDCCH, a new DCI format may be required to support the signaling. In order to support non-contiguous resource allocations (i.e., cluster based DFT-OFDMA) within a component carrier, it is preferable that SRS transmission covers a wideband in the frequency domain (at least the frequency band of interest for the frequency domain scheduling).

Static or semi-static SRS scheduling can be used. Depending on the number of WTRU transmit antennas and/or WTRU category, SRS transmission scheduling is determined and signaled to the WTRU via higher layer signaling. Alternatively, dynamic SRS scheduling (i.e., aperiodic SRS transmission) may be used through L1 signaling (i.e., PDCCH).

For Periodic SRS transmission, SRS periodicity can be configurable and signaled from higher layers. The periodicity may be a function of the number of WTRU transmit antennas (or antenna ports or layers). SRSs from different antennas (or antenna ports) may have different periodicities. The location of SRSs (i.e., subframe offset) can be configurable and signaled from higher layers. SRSs from different antennas (or antenna ports) may have different subframe offsets. The location of SRS from one antenna may be implicitly determined from that from other antenna(s). A frequency hopping technique can be applied when a narrow SRS bandwidth is used. Each antenna may have a different hopping pattern.

In UL carrier aggregation, the SRS parameters for each carrier may be configured/signaled separately (i.e., carrier specific SRS parameters) or jointly (e.g., common parameters for all (or a subset of) carriers. SRS can be triggered by an aperiodic request or be scheduled for periodic transmission. In one embodiment, one bit is inserted in PDCCH (e.g., an UL grant) as "SRS request" bit for aperiodic SRS transmission. An aperiodic SRS request carried in PDCCH (e.g., an UL grant) can be used to trigger SRS transmissions from multiple transmit antennas and/or for multiple UL carriers. In another embodiment a code-point in existing PDCCH (e.g. UL grant) is used as an "SRS request" for aperiodic SRS transmission.

There are two possible methods for triggering SRS for multiple UL carriers. A PDCCH, carrying a UL grant (carrying an aperiodic SRS request) for a particular UL carrier will be used to trigger SRS transmission for that particular UL carrier. For example, a SRS-request bit (maybe and other SRS parameters) may be included in the PDCCH to request an aperiodic SRS transmission for that particular UL carrier. Alternatively, a PDCCH carrying a UL grant (carrying an aperiodic SRS request) for a particular UL carrier will be used to trigger SRS transmission for all or several UL carriers (which is preconfigured in higher layer signaling).

SRS can be triggered by a measurement or NACK threshold. If a WTRU has a pre-configured SRS allocation, the WTRU will not send SRS unless certain conditions are met. Such conditions can include: i) a pathloss change that greater than a pathloss change threshold, ii) the number of NACKs exceeds a NACK threshold (e.g., a % and/or moving average), UL power control changes by more than a threshold (e.g., specified in dB).

Measurements may be performed at an eNodeB and SRS can be triggered based on the measurement. Once SRS transmission is triggered, such information can be sent to the WTRU so that WTRU may transmit SRS accordingly. If SRS transmission is not trigger, the information may also be sent to WTRU and WTRU may reuse those resources reserved for SRS for transmitting other information (e.g., data, control, etc.).

In LTE, the setting of the WTRU transmit power, $P_{SRS}$, for the SRS transmitted on subframe i is defined by $$P_{SRS}(i) = \min\{P_{MAX}, P_{SRS\_OFFSET} + 10 \log_{10}(M_{SRS}) + P_{O\_PUSCH}(j) + \alpha \cdot PL(k) + f(i)\} \text{ [dBm]} \quad \text{Eq. 4}$$

The LTE UL power control is limited to only one carrier and one transmit antenna (no SU-MIMO in UL). In future LTE releases, carrier aggregation and UL SU-MIMO will be used. A new specification of SRS power control is needed.

In one embodiment, UL carrier aggregation can be carried out with a single transmit antenna. In this example, it is also assumed that there is neither PUSCH nor PUCCH transmitted simultaneously in the same SC-FDMA symbol as SRS is sent (i.e., the last symbol of the subframe in the presence of SRS).

In general, the WTRU will determine an unconstrained SRS power level for a given component carrier. The WTRU will select the lesser of the unconstrained SRS power level and component carrier based maximum power level as a constrained SRS power level for the component carrier. The SRS transmit power level for the component carrier is set to the constrained SRS power level.

In this scenario, SRSs are transmitted simultaneously over multiple component carriers by a WTRU configured in a mode which supports UL carrier aggregation. There are two possible options for SRS power control: one for component carrier specific power control and the other for carrier common power control. In component carrier specific power control, the LTE SRS PC formula is extended to UL carrier aggregation, having some of the parameters carrier-specific as follows:

$$P_{SRS}(i, k) = \min\{P_{MAX}(k), P_{SRS\_OFFSET}(k) + 10 \log_{10}(M_{SRS}(k)) + P_{O\_PUSCH}(j, k) + \alpha(k) \cdot PL(k) + f(i,k)\} \quad \text{Eq. 5}$$

where k is the carrier index.

Pmax(k) may be a component carrier specific parameter, representing the maximum power for the k-th component carrier, particularly for one power amplifier (PA) per component carrier (CC) (or a subset of CCs). In this case, the total maximum WTRU transmit power may be equally distributed among the multiple PAs. That is, Pmax(k) (dB) =Pmax−10*log 10(Npa) where Npa is the number of active PAs in the WTRU. If there is only one PA for all carriers, then Pmax(k) may be equal to the total maximum WTRU transmit power, Pmax. In this case, if the sum of the required transmit powers for all the UL carriers is greater than Pmax, then some of the power reduction techniques known in the art may be used. For instance, the transmit powers for the individual carrier SRS can be reduced evenly to meet the maximum power constraint. Alternatively, the transmit powers for the individual carrier SRS may be reduced relatively (e.g. proportional to the individual SRS power) to meet the maximum power constraint. Alternatively, one or some of the SRS transmissions may be dropped, for example, SRS in non-anchor carrier). Additional criteria can be used for determining which SRS transmission (on a per component carrier (CC) basis and/or a subband basis) are transmitted and which are dropped. These criteria can be based on: 1) a predefined (configured) priority of SRS transmissions, 2) the history of previous SRS transmissions, e.g. when only a limited number of the scheduled or requested SRS CC and/or subband can be supported, the WTRU will cycle though the configured SRSs to be transmitted at each SRS transmission opportunity, until all SRSs which are configured have been transmitted, the WTRU will then cycle back to the first SRS transmission, 3)The WTRU can select which CC(s) and/or subband(s) which it views as most favorable and transmits SRS in those bands to the limit of the power available. In addition to dropping techniques, the WTRU may also implement uneven SRS power scaling. The uneven SRS power scaling may also be based on the above criteria.

$P_{SRS\_OFFSET}(k)$ is the component carrier specific SRS offset. $P_{SRS\_OFFSET}(k)$ is provided by higher layers. To reduce the signaling overhead, instead of signaling an absolute value of $P_{SRS\_OFFSET}(k)$ for each UL component carrier, the network (eNodeB) may signal an actual value of $P_{SRS\_OFFSET}$ only for an anchor carrier, but signal relative values for non-anchor carrier(s), where the values are relative to the value for the anchor carrier. Alternatively, $P_{SRS\_OFFSET}(k)$ may be a carrier common parameter such as $P_{SRS\_OFFSET}(k) = P_{SRS\_OFFSET}$ for all k.

It is possible to have different SRS bandwidth on different carrier (but very unlikely per antenna), therefore a new $M_{SRS}$ per carrier, $M_{SRS}(k)$, needs to be defined.

$P_{O\_PUSCH}(j, k)$ is the carrier specific open loop parameter (in this case, for the k-th carrier). This is for handling different targets (e.g., SINR) for different carriers. Particularly, since $P_{O\_PUSCH}$ is composed of the sum of a cell specific nominal parameter, $P_{O\_NOMINAL\_PUSCH}$, and a WTRU specific component, $P_{O\_UE\_PUSCH}$, and the cell specific parameter, $P_{O\_NOMINAL\_PUSCH}$, would be common to all the carriers, different targets are reflected in $P_{O\_UE\_PUSCH}(j, k)$. Alternatively, different targets may be reflected in $P_{O\_NOMINAL\_PUSCH}(j, k)$ while have a $P_{O\_UE\_PUSCH}$ common to all the carriers. Alternatively, PO_PUSCH(j, k) may be common to all the carriers. In this case, PO_PUSCH(j, k)=PO_PUSCH(j).

The path loss compensation factor, PL(k), and the fractional PL factor, α(k) may be carrier-specific as well where PL(k) is determined at the WTRU and α(k) for all k are provided by higher layer signaling. Alternatively, α(k) may be common to all carriers.

As noted above, the WTRU can perform measurements on a single component carrier (Kp) and derive the path loss for other carriers using carrier specific offset signaled form the network such as $PL(k) = PL(Kp) + \Delta_{PL}(k)$. However, this requires introducing new higher layer signaling for $\Delta_{PL}(k)$. Instead, the carrier specific pathloss offset may be absorbed in $P_{O\_UE\_PUSCH}$ in $P_{O\_PUSCH}$. In this case, the range of $P_{O\_UE\_PUSCH}$ needs to be changed accordingly and the same PL(k) (i.e., PL(k)=PL) may be used for all carriers. This idea may be also applied for PC for PUSCH and PUCCH.

f(i, k) is the closed loop PUSCH power adjustment function, f, for the k-th carrier. This implies that the TPC command for PUSCH is assumed to be carrier specific. If the k-th carrier has SRS transmitted in next SRS subframe, but there is no f(i, k) available (due to no previous PUSCH transmission) in the carrier, then a composite f(i) may be used for f(i, k) where the composite f(i) is determined by combining other f(i, n) where n≠k. Alternatively, f(i, k) may be common to all carriers for the WTRU. That is, f(i, k)=f(i) by combining all the f(i, k) for all k. For example $$f(i) = \frac{1}{N}\sum_{k=1}^{N} f(i, k) \quad \text{Eq. 6}$$

where N is the number of UL carriers assigned to the WTRU. This option is preferable for the case with non-contiguous carrier aggregation where different carriers are likely to experience different channel conditions.

Figure 3:
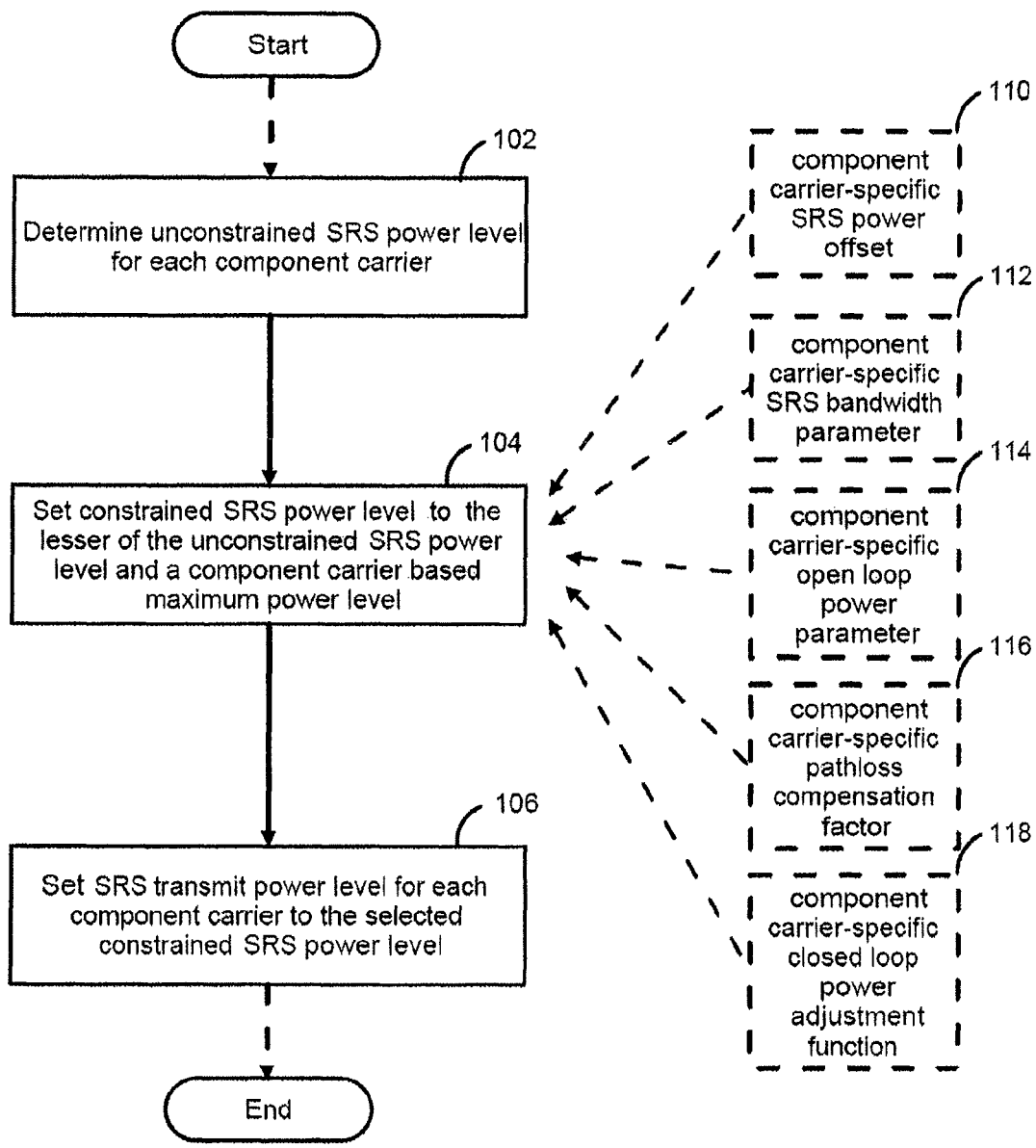
FIG. 3 is a basic flow chart showing component carrier specific SRS power control.

FIG. 3 is a basic flow chart showing component carrier specific SRS power control. It is understood that the basic flowcharts disclosed herein are illustrative only. For example, other program entry and exit points, time out functions, error checking routines and the like (not shown) would normally be implemented in software/hardware. It is also understood that such hardware/software can be implemented to run continuously. Accordingly start blocks and end blocks are intended to indicate logical beginning and ending points of a portion of code that can be integrated into a main program, library or the like and executed as needed. In this example, the unconstrained SRS power level (e.g., Pmax(k)) for each component carrier is determined as shown by block 102. The constrained SRS power level for each component carrier is set to the lesser of the unconstrained SRS power level and a component carrier based maximum power level as shown by block 104. As discussed above, the component carrier based maximum power level can be a carrier specific power level based on at least one of: i) a component carrier-specific SRS power offset as shown by block 110, ii) a component carrier-specific SRS bandwidth parameter as shown by block 112, iii) a component carrier-specific open loop power parameter as shown by block 114, iv) a component carrier-specific pathloss compensation factor as shown by block 116, or v) a component carrier-specific closed loop power adjustment function as shown by block 118. The SRS transmit power level for each component carrier is set to the selected constrained SRS power level as shown by block 106.

Carrier-common power control for SRS can also be used. This can reduce SRS PC relevant parameter signaling overhead. A common transmit power may be used for all the carriers as follows:

$$P_{SRS}(i)=\min\{P_{MAX}, P_{SRS\_OFFSET}+10\log_{10}(M_{SRS})+P_{O\_PUSCH}(j)+\alpha \cdot PL+f(i)\} \quad \text{Eq. 7}$$

where $P_{SRS\_OPPSET}$, $M_{SRS}$, PL, f(i), respectively, represent the carrier-common parameters, respectively, combined over all the UL carriers. For example, $$f(i) = \frac{1}{N}\sum_{k=1}^{N} f(i, k) \quad \text{Eq. 8}$$

where N is the number of UL carriers assigned to the WTRU.

Power reduction techniques can be used when the sum of the required transmit powers for all the UL carriers exceeds Pmax. For example, the transmit powers for the individual carrier SRS can be reduced evenly to meet the maximum power constraint. Alternatively, the transmit powers for the individual carrier SRS may be reduced relatively (e.g. proportional to the individual SRS power) to meet the maximum power constraint. Alternatively, one or some of the SRS transmissions may be dropped, for example, SRS in non-anchor carrier). Additional criteria can be used for determining which SRS transmission (on a per component carrier (CC) basis and/or a subband basis) are transmitted and which are dropped. These criteria can be based on: 1) a predefined (configured) priority of SRS transmissions, 2) the history of previous SRS transmissions, e.g. when only a limited number of the scheduled or requested SRS CC and/or subband can be supported, the WTRU will cycle though the configured SRSs to be transmitted at each SRS transmission opportunity, until all SRSs which are configured have been transmitted, the WTRU will then cycle back to the first SRS transmission, 3) The WTRU can select which CC(s) and/or subband(s) which it views as most favorable and transmits SRS in those bands to the limit of the power available. In addition to dropping techniques, the WTRU may also implement uneven SRS power scaling. The uneven SRS power scaling may also be based on the above criteria.

Figure 4:
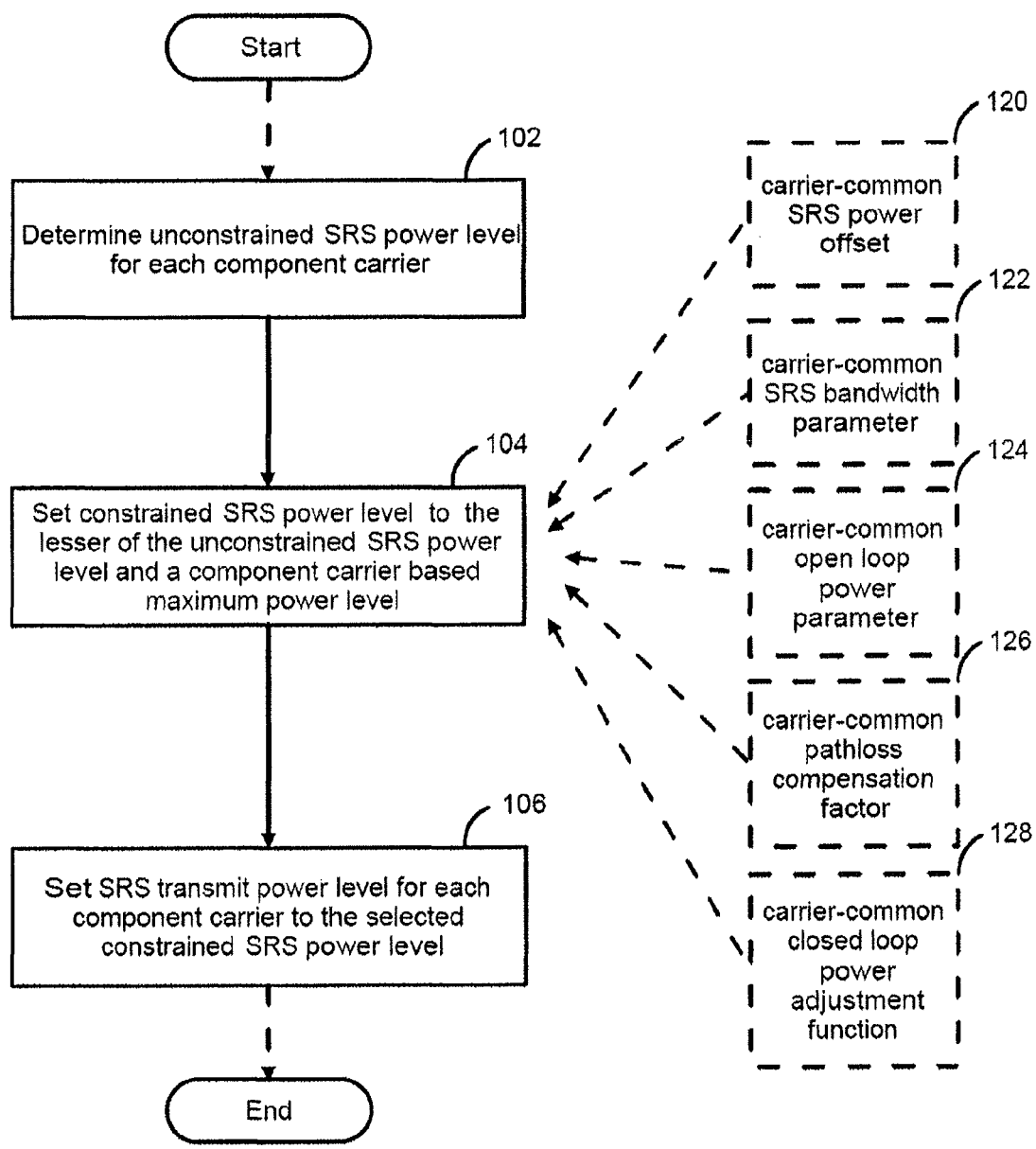
FIG. 4 is a basic flow chart showing carrier common SRS power control.

FIG. 4 is a basic flow chart showing carrier-common SRS power control. In this example, the unconstrained SRS power level (e.g., Pmax) for all component carriers is determined as shown by block 102. The constrained SRS power level for each component carrier is set to the lesser of the unconstrained SRS power level and a component carrier based maximum power level as shown by block 104. As discussed above, the component carrier based maximum power level can be a carrier specific power level based on at least one of: i) a carrier-common SRS power offset as shown by block 120, ii) a carrier-common SRS bandwidth parameter as shown by block 122, iii) a carrier-common open loop power parameter as shown by block 124, iv) a carrier-common pathloss compensation factor as shown by block 126, or v) a carrier-common closed loop power adjustment function as shown by block 128. The SRS transmit power level for each component carrier is set to the selected constrained SRS power level as shown by block 106.

In Case-2, SRSs in CA are transmitted in TDM. When SRSs are transmitted using TDM (i.e., one SRS transmission in a SRS subframe and in a carrier), the power setting for SRS is determined according to PC formula, but in this case, Pmax is the total WTRU maximum power, as:

$$P_{SRS}(i, k)=\min\{P_{MAX}, P_{SRS\_OFFSET}(k)+10\log_{10}(M_{SRS}(k))+P_{O\_PUSCH}(j, k)+\alpha(k)\cdot PL(k)+f(i, k)\} \quad \text{Eq. 9}$$

When SRSs are transmitted over multiple antenna ports (or layers), PC requirement/operation is must be defined. A possible option is to modify the LTE UL PC formula such that the setting of the WTRU transmit power for the SRS transmitted in the n-th antenna port (or layer) in subframe i.

$$P_{SRS}(i, n)=\min\{P_{MAX}, P_{SRS\_OFFSET}+10\log_{10}(M_{SRS}(i, n))+P_{O\_PUSCH}(j)+\alpha \cdot PL+f(i)+\Delta_{SRS\_MIMO}(j)\} \quad \text{Eq. 10}$$

where n is the antenna port (or layer) index.

Pmax is the total maximum WTRU power. $M_{SRS}(i, n)$ is an antenna port specific SRS BW bandwidth parameter. $M_{SRS}(i, n)$ is the BW of the SRS transmission over the n-th antenna port (or layer) in subframe i in terms of number of RBs. It is possible for each antenna port (or layer) to use a different (flexible) number of RBs (e.g., allowing different SRS densities in frequency), in order to reduce SRS overhead in MIMO.

Figure 5:
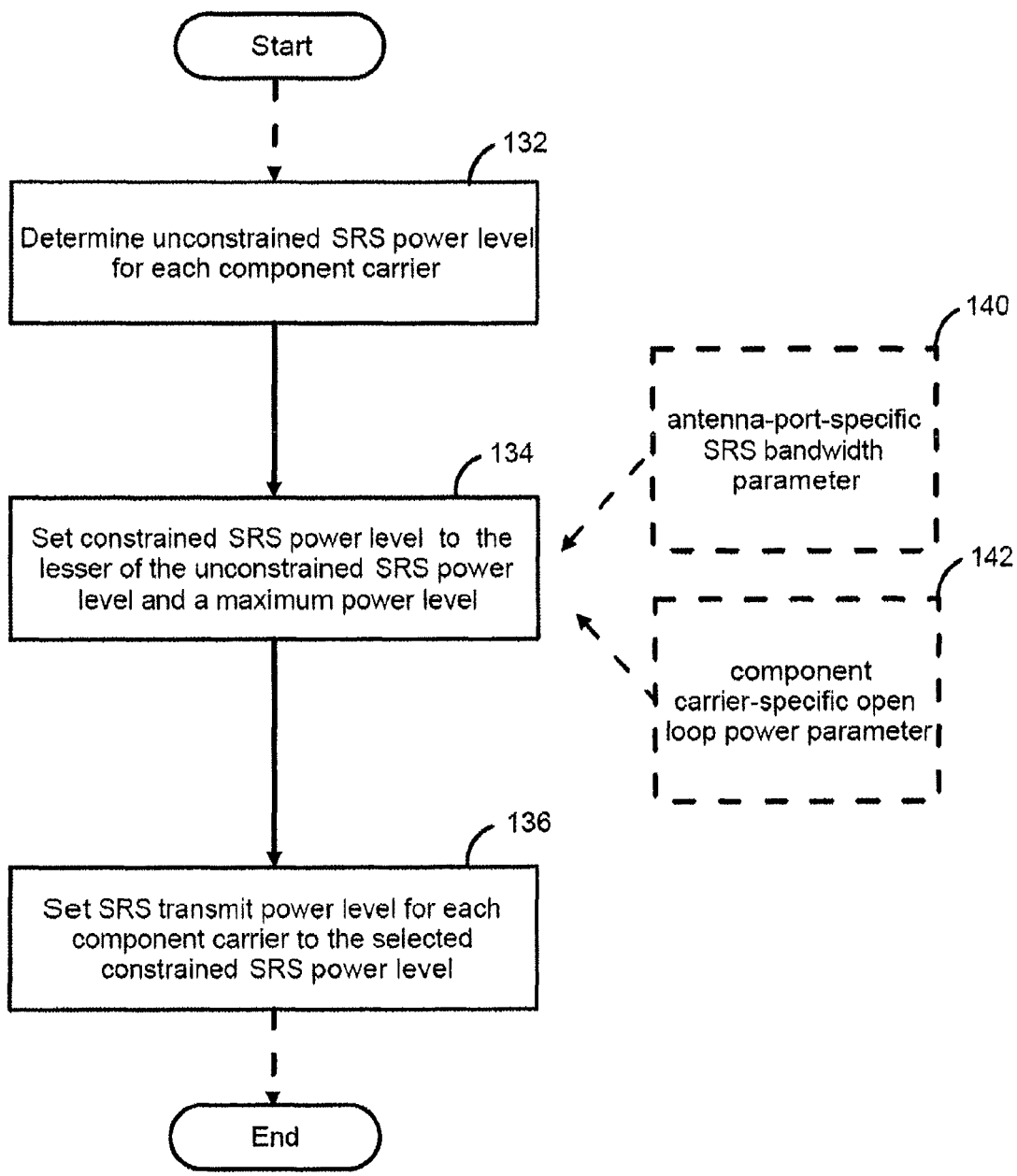
FIG. 5 is a basic flow chart showing SRS power control for configurations where SRSs are transmitted over multiple antenna ports (or layers).

FIG. 5 is a basic flow chart showing SRS power control for configurations where SRSs are transmitted over multiple antenna ports (or layers). It is understood that such techniques can be combined with the SRS power control methods disclosed above (e.g., such as the techniques shown in FIGS. 3 and 4). In this example, the unconstrained SRS power level (e.g., Pmax) for all component carrier is determined as shown by block 132. The constrained SRS power level for each component carrier is set to the lesser of the unconstrained SRS power level and a component carrier based maximum power level as shown by block 134. As discussed above, the component carrier based maximum power level can be a carrier specific power level based on at least one of: i) an antenna-port-specific SRS bandwidth parameter as shown by block 140 or ii) SRS MIMO offset parameter as shown by block 142. The SRS transmit power level for each component carrier is set to the selected constrained SRS power level as shown by block 136.

With UL MIMO (e.g., up to four antennas) for PUSCH, there may be various MIMO options (including SM MIMO, Tx diversity, and BF) for PUSCH transmission. However, the SRS transmission mode with multiple antennas may be deterministic (or semi-static). In that case, different $P_{SRS\_OFFSET}$ values may be required for different MIMO options for PUSCH. The range of $P_{SRS\_OFFSET}$ may need to be modified appropriately.

Alternatively, a SRS MIMO offset parameter, $\Delta_{SRS\_MIMO}(j)$ can be used as shown in the above equation, where the offset represents a MIMO gain difference between the MIMO mode used for PUSCH and the MIMO mode used for SRS. SRS may be precoded. For instance, when PUSCH uses a Tx Diversity mode and SRSs are transmitted over multiple antennas (but not precoded), $\Delta_{SRS\_MIMO}(j)$ may be set to 3 dB or so. $\Delta_{SRS\_MIMO}$ may be provided by higher layers, such as using a look up table via semi static signaling. The following Table 2 is provided for example. It is understood that other number could be used:

TABLE 2

Example of Look Up table for $\Delta_{SRS\_MIMO}$

| MIMO mode for PUSCH | SRS Tx mode | $\Delta_{SRS\_MIMO}$ (dB) |
|---|---|---|
| Open loop SM MIMO | Precoded | −2 |
| | No precoded | 0 |
| Closed loop SM MIMO | Precoded | 0 |
| | No precoded | 2 |
| Tx Diversity | Precoded | 1 |
| | No precoded | 3 |
| BF | Precoded | 0 |
| | No precoded | 4 |
| Single antenna | Precoded | −2 |
| | No precoded | 0 |
| UL COMP | Precoded | 2 |
| | No precoded | 4 |

Alternatively, $\Delta_{SRS\_MIMO}(j)$ may be absorbed in $P_{O\_PUSCH}$ (especially $P_{O\_UE\_PUSCH}$), so that the term $\Delta_{SRS\_MIMO}(j)$ may be removed from the above equation. In this case, the range of $P_{O\_UE\_PUSCH}$ may require modification.

With UL MIMO (e.g., up to four antennas), if simultaneous SRS transmissions over multiple transmit antennas occur, the transmit power density of SRS for each antenna (or antenna port) gets lower as the number of antennas (or antenna ports) increases, which may degrade channel estimation performance at the eNodeB. This problem may be resolved as follows.

Option-1: The eNodeB can signal the WTRU via higher layers to switch to TDM mode for SRS transmission such as one SRS transmission in a single antenna (or at most two SRSs over two antennas) in each SRS subframe.

Option-2: When the sum of the required WTRU transmit powers for SRS transmissions simultaneously over multiple antennas exceeds the maximum WTRU power by a predefined threshold, the WTRU can select one SRS (possibly more SRSs, if transmit power is available) to be transmitted in next SRS subframe, where the selection is based on a rotation manner.

Option-3: SRS BW, $M_{SRS}(i, n)$, can be adjusted (reconfigured) appropriately by the eNodeB and signaled to the WTRU via higher layers. A power reduction technique can be used when the sum of the required transmit powers for simultaneous SRS transmissions over multiple antennas exceeds Pmax. For example, the transmit powers for the individual SRS can be reduced evenly to meet the maximum power constraint. Alternatively, the transmit powers for the individual carrier SRS may be reduced relatively (e.g. proportional to the individual SRS power) to meet the maximum power constraint. Alternatively, one or some of the SRS transmissions may be dropped, for example, SRS in non-anchor carrier). Additional criteria can be used for determining which SRS transmission (on a per component carrier (CC) basis and/or a subband basis) are transmitted and which are dropped. These criteria can be based on: 1) a predefined (configured) priority of SRS transmissions, 2) the history of previous SRS transmissions, e.g. when only a limited number of the scheduled or requested SRS CC and/or subband can be supported, the WTRU will cycle though the configured SRSs to be transmitted at each SRS transmission opportunity, until all SRSs which are configured have been transmitted, the WTRU will then cycle back to the first SRS transmission, 3)The WTRU can select which CC(s) and/or subband(s) which it views as most favorable and transmits SRS in those bands to the limit of the power available. In addition to dropping techniques, the WTRU may also implement uneven SRS power scaling. The uneven SRS power scaling may also be based on the above criteria. Alternatively, Pmax in the PC equation may be defined per power amplifier (PA). In this case, the total maximum WTRU transmit power may be equally distributed among the multiple PAs. That is, Pmax (dB)=Pmax−10*log 10(Npa) where Npa is the number of active PAs in the WTRU in a given SRS subframe.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

The invention claimed is:

1. A wireless transmit/receive unit (WTRU) comprising:
a processor configured to at least:
receive sounding reference signal (SRS) configuration information, wherein the SRS configuration information indicates a plurality of SRS parameter sets;
receive a physical downlink control channel (PDCCH) transmission, wherein the PDCCH transmission indicates a first SRS parameter set out of the plurality of SRS parameter sets to be used for a first SRS transmission and a second SRS parameter set out of the plurality of SRS parameter sets to be used for a second SRS transmission, wherein the first SRS parameter set is associated with a first carrier and the second SRS parameter set is associated with a second carrier; and
transmit the first SRS transmission on the first carrier and the second SRS transmission on the second carrier, wherein the first SRS transmission is transmitted based on the indicated first SRS parameter set, and wherein the second SRS transmission is transmitted based on the indicated second SRS parameter set.

2. The WTRU of claim 1, wherein the processor is configured to receive the SRS configuration information using radio resource control (RRC) signaling.

3. The WTRU of claim 1, wherein the PDCCH transmission comprises an aperiodic SRS request.

4. The WTRU of claim 1, wherein each SRS parameter set of the plurality of SRS parameter sets comprises at least one of a transmission comb, a time offset, a time duration, an SRS bandwidth, a cyclic shift, or a frequency hopping bandwidth.

5. The WTRU of claim 1, wherein the first carrier and the second carrier are configured using higher layer signaling.

6. A method comprising:
receiving sounding reference signal (SRS) configuration information, wherein the SRS configuration information indicates a plurality of SRS parameter sets;
receiving a physical downlink control channel (PDCCH) transmission, wherein the PDCCH transmission indicates a first SRS parameter set out of the plurality of SRS parameter sets to be used for a first SRS transmission and a second SRS parameter set out of the plurality of SRS parameter sets to be used for a second SRS transmission, wherein the first SRS parameter set is associated with a first carrier and the second SRS parameter set is associated with a second carrier; and
transmitting the first SRS transmission on the first carrier and the second SRS transmission on the second carrier, wherein the first SRS transmission is transmitted based on the indicated first SRS parameter set, and wherein the second SRS transmission is transmitted based on the indicated second SRS parameter set.

7. The method of claim 6, further comprising receiving the SRS configuration information using radio resource control (RRC) signaling.

8. The method of claim 6, wherein the PDCCH transmission comprises an aperiodic SRS request.

9. The method of claim 6, wherein each SRS parameter set of the plurality of SRS parameter sets comprises at least one of a transmission comb, a time offset, a time duration, an SRS bandwidth, a cyclic shift, or a frequency hopping bandwidth.

10. The method of claim 6, wherein the first carrier and the second carrier are configured using higher layer signaling.

* * * * *